United States Patent
Chen et al.

(10) Patent No.: US 9,703,148 B2
(45) Date of Patent: Jul. 11, 2017

(54) DISPLAY PANEL

(71) Applicant: INNOLUX CORPORATION, Jhu-Nan, Miao-Li County (TW)

(72) Inventors: Cheng-Hsiung Chen, Jhu-Nan (TW); Chao-Hsiang Wang, Jhu-Nan (TW); Yi-Ching Chen, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 0 days.

(21) Appl. No.: 15/047,487

(22) Filed: Feb. 18, 2016

(65) Prior Publication Data

US 2016/0274390 A1 Sep. 22, 2016

(30) Foreign Application Priority Data

Mar. 19, 2015 (TW) .............................. 104108822 A

(51) Int. Cl.
*G02F 1/1339* (2006.01)
*G02F 1/1335* (2006.01)

(52) U.S. Cl.
CPC ...... *G02F 1/1339* (2013.01); *G02F 1/133512* (2013.01); *G02F 2202/28* (2013.01)

(58) Field of Classification Search
CPC ............ C09K 11/7792; C09K 11/7734; C09K 11/0883; C08K 3/34; H01L 33/502; H01L 2224/48247; H01L 2224/8592; H01L 2224/48091; H01L 2924/181; H01L 33/504

USPC .......................................................... 257/72
See application file for complete search history.

(56) References Cited

U.S. PATENT DOCUMENTS

2014/0087503 A1* 3/2014 Chang .................. G02F 1/1333
438/30

FOREIGN PATENT DOCUMENTS

| CN | 101118353 | 2/2008 |
|---|---|---|
| JP | 11-109373 | 4/1999 |
| JP | 2010-020069 | 1/2010 |
| JP | 2010-102066 | 5/2010 |
| KR | 10-1027796 | 4/2011 |

* cited by examiner

*Primary Examiner* — Fernando L Toledo
*Assistant Examiner* — Adam S Bowen
(74) *Attorney, Agent, or Firm* — Liu & Liu

(57) ABSTRACT

A display panel includes an active area and a peripheral area surrounding the active area, and includes first and second substrates, a shading layer and an adhesive agent. The second substrate is disposed opposite the first substrate. The shading layer is disposed on the first substrate and corresponds to the peripheral area. The shading layer includes a first contact surface contacting with the first substrate, the first contact surface has a first edge. The adhesive agent is disposed between the first substrate and the second substrate and corresponds to the shading layer. The adhesive agent includes two second contact surfaces respectively facing the first substrate and the second substrate, one of the second surfaces has a second edge near the active area, and the line edge roughness of the second edge is greater than that of the first edge.

10 Claims, 4 Drawing Sheets

DISPLAY PANEL

CROSS REFERENCE TO RELATED APPLICATIONS

This Non-provisional application claims priority under 35 U.S.C. §119(a) on Patent Application No(s). 104108822 filed in Taiwan, Republic of China on Mar. 19, 2015, the entire contents of which are hereby incorporated by reference.

BACKGROUND

Technical Field

The disclosure relates to a display panel, and in particular to a display panel of high reliability.

Related Art

As the progressive of technology, a flat display panel is widely applied to various fields. Because it has advantages of compact volume, low power consumption, and non-radiation, it gradually replaces traditional CRT (cathode ray tube) display device and applies to various electronic products, for example, mobile phone, portable multimedia device, notebook computer, LCD (liquid crystal display) TV or LCD monitor, etc.

Taking an LCD display for example, the LCD display includes a display panel and a backlight module. The display panel includes a thin film transistor (TFT) substrate, a color filter substrate and a liquid crystal layer sandwiched between both of the substrates. Herein, during manufacturing the conventional display panel, for example, a sealant is applied to the periphery of the TFT substrate, and the liquid crystals are injected within the sealant. Then, the TFT substrate is attached correspondingly to the color filter substrate in vacuum environment, and the sealant is solidified to obtain an LCD panel. However, as to the LCD panel, sometimes liquid crystal molecules may leak or external moisture may enter the display panel due to insufficient adhesion between the sealant and the substrates. As a result, the product reliability falls down.

Therefore, it is an important subject to provide a display panel in which the adhesion strength between the adhesive agent and the substrates is enhanced for improving product reliability.

SUMMARY

One objective of the disclosure is to provide a display panel in which the adhesion strength between the adhesive agent and the substrates is enhanced and the product reliability is improved.

A display panel according to the disclosure includes an active area and a peripheral area surrounding the active area. It comprises a first substrate, a second substrate, a shading layer and an adhesive agent. The second substrate is disposed opposite the first substrate. The shading layer is disposed on the first substrate and located in the peripheral area. The shading layer includes a first contact surface contacting with the first substrate, and the first contact surface has a first edge. The adhesive agent is disposed between the first substrate and the second substrate, and corresponds to the shading layer. The adhesive agent includes two second contact surfaces respectively facing the first substrate and the second substrate, one of the second surfaces has a second edge near the active area, and the line edge roughness of the second edge is greater than that of the first edge.

In one embodiment, the display panel further includes a color filter substrate, and the color filter substrate includes the first substrate and the shading layer.

In one embodiment, the shading layer further includes a first side wall, the adhesive agent further comprises a second side wall near the first side wall of the shading layer, and the surface roughness of the second side wall is greater than that of the first side wall.

In one embodiment, the second side wall of the adhesive agent is near the active area, the adhesive agent further includes a plurality of bubbles, and the bubbles are close to the second side wall.

In one embodiment, one of the second contact surfaces further includes an embossed pattern, and the embossed pattern is like a lattice.

In one embodiment, the adhesive agent includes a plurality of bubbles distributed near the active area.

In one embodiment, the adhesive agent further includes a side wall near the active area, and the bubbles are close to the side wall.

In one embodiment, the shading layer further includes a groove, and the groove corresponds to the adhesive agent.

In one embodiment, the adhesive agent is formed as a rectangular enclosure between the first substrate and the second substrate, the adhesive agent includes at least one straight portion and at least one corner portion, and the maximum width of the corner portion is greater than that of the straight portion.

In one embodiment, the first substrate further has a third edge away from the active area, and the first edge of the shading layer is located between the second edge of the adhesive agent and the third edge of the first substrate.

In one embodiment, the display panel further includes a display medium layer, the adhesive agent encloses the first substrate and the second substrate to define a space, and the display medium layer is disposed in the space.

In summary, as to the display panel according to the disclosure, the shading layer includes a first contact surface contacting with the first substrate, and the first contact surface has a first edge. In addition, the adhesive agent corresponds to the shading layer, and the adhesive agent includes two second contact surfaces respectively facing the first substrate and the second substrate. One of the second surfaces has a second edge near the active area, and the line edge roughness of the second edge is greater than that of the first edge. Because the line edge roughness of the second edge of the adhesive agent is greater, relatively the contact length between the adhesive agent and the substrates is also longer. Therefore, the adhesive capability between the adhesive agent and the substrates is enhanced, and the display medium will as little as possible leak. Besides, the external moisture will also as little as possible enter the display panel, so the product reliability of the display panel is improved.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
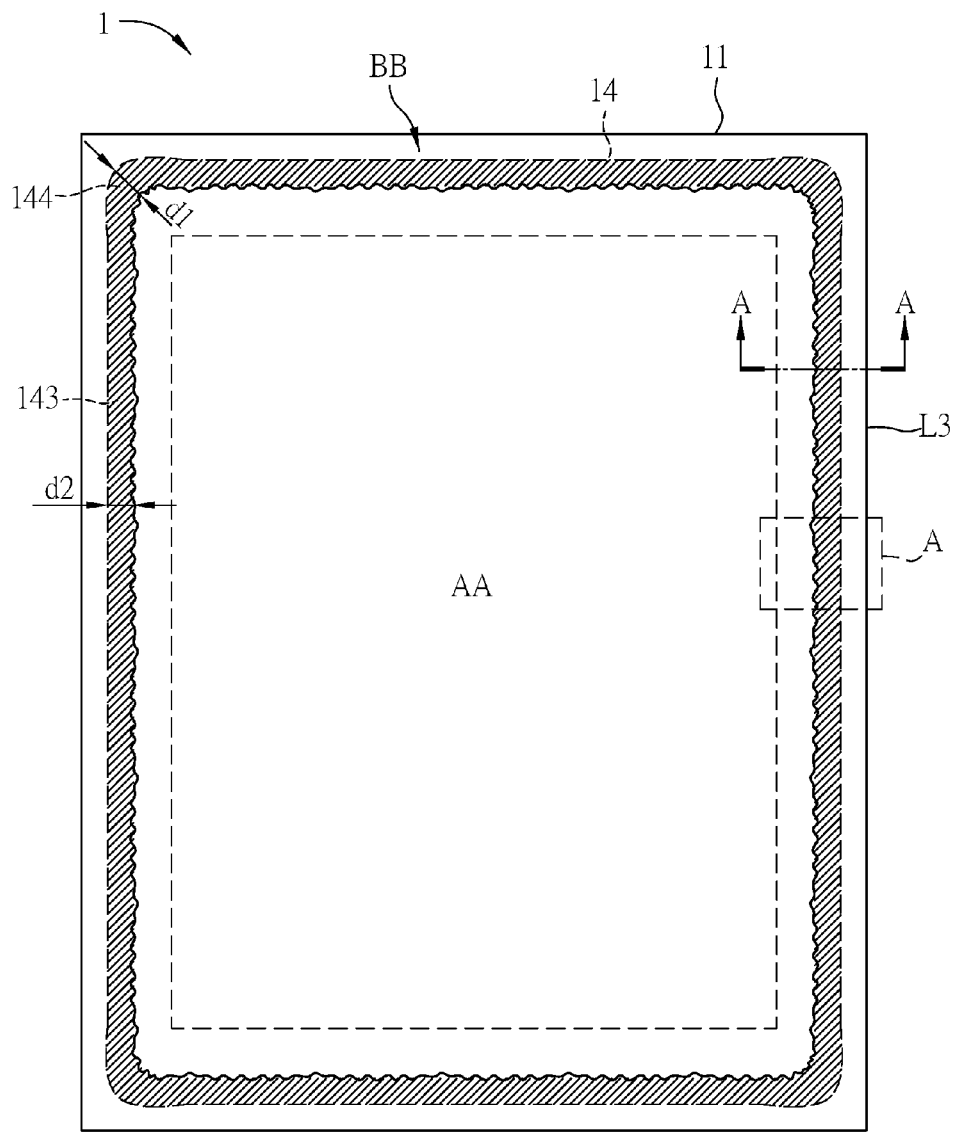
FIG. 1 is a schematic top view showing a display panel according to the embodiment of the disclosure.
Figure 2:
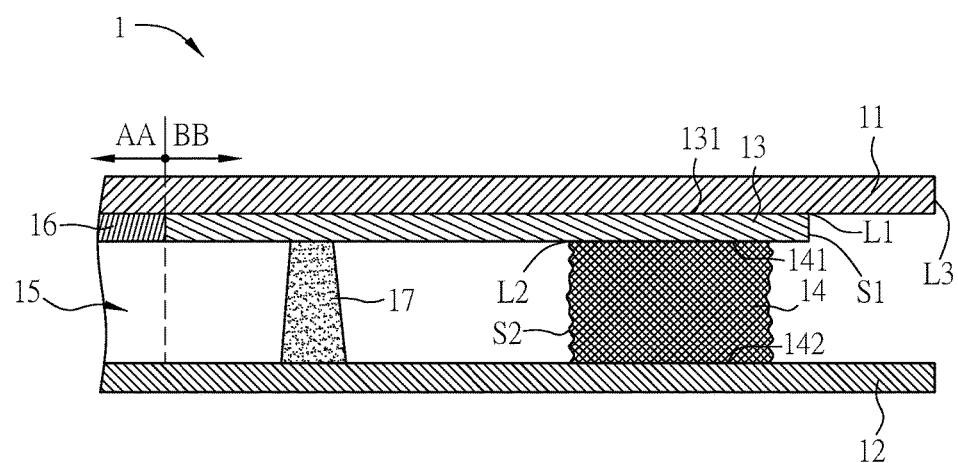
FIG. 2 is a sectional schematic diagram along line A-A in FIG. 1.
Figure 3:
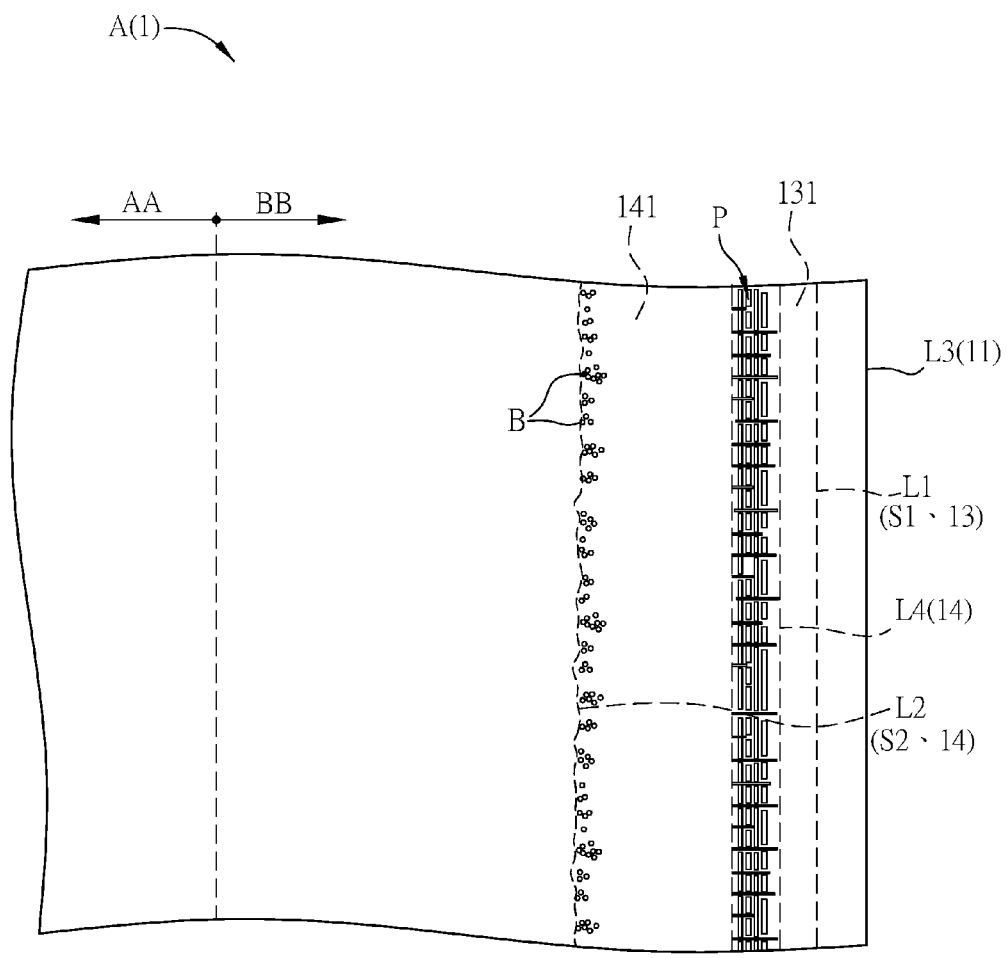
FIG. 3 is an enlarged schematic diagram showing the zone A in the display panel in FIG. 1.

Referring to FIG. 1 to FIG. 3, FIG. 1 is a schematic top view showing a display panel 1 according to the embodiment of the disclosure. FIG. 2 is a sectional schematic diagram along line A-A in FIG. 1, and FIG. 3 is an enlarged schematic diagram showing the zone A in the display panel 1 in FIG. 1.

Referring to FIG. 1, the display panel 1 includes an active area AA and a peripheral area BB surrounding the active area AA. Herein, when overlooking the display panel 1, it is clear that the active area AA represents the region of the display panel 1 which the light beam can pass through to display an image screen. Furthermore, the peripheral area BB represents the region which surrounds the active area AA and the light beam can not pass through.

Referring to FIG. 2, the display panel 1 includes a first substrate 11, a second substrate 12 and a display medium layer 15. In addition, the display panel 1 further includes a shading layer 13 and an adhesive agent 14.

The first substrate 11 and the second substrate 12 are disposed opposite each other. The display medium layer 15 is sandwiched between the first substrate 11 and the second substrate 12. The display panel 1 may be a LCD (liquid crystal display) panel or an OLED (organic light-emitting diode) display panel. Herein, the display panel 1 is the LCD panel for example, so the display medium layer 15 is a liquid crystal layer. Alternatively, if the display panel 1 is an OLED display panel, the display medium layer 15 may be a cover plate to protect the organic light-emitting layer from external moisture or particle pollution.

The first substrate 11 or the second substrate 12 may be formed by transparent material. For example, the material may be glass, quartz or the like, plastic, rubber, fiberglass, or other polymer materials. Alternatively, the first substrate 11 or the second substrate 12 may be formed by non-transparent material. For example, the material may be composite plate of metal-fiberglass, composite plate of metal-ceramics, printed circuit board, or other material. In the embodiment, the material of both of the first substrate 11 and the second substrate 12 are transparent glass for example.

The shading layer 13 is disposed on the first substrate 11 and located in the peripheral area BB. In the embodiment, when overlooking the display panel 1 above the first substrate 11, it is seen that the shading layer 13 at least covers most of the peripheral area BB (FIG. 1 does not shows the shading layer 13, FIG. 3 shows the edge of each element and relative position of active area AA but does not show the second substrate 12). The shading layer 13 may be a black matrix, and it is formed by non-transparent material, for example, metal or resin. The metal for example may be chrome, chromium or nitrogen oxide chromium compounds. Because the shading layer 13 is non-transparent material, it can define a non-transparent region (namely peripheral area BB) on the first substrate 11, and thus a transparent region (namely active area AA) is also defined.

Besides, the display panel 1 in the embodiment further includes a filter layer 16. The filter layer 16 is disposed on the first substrate 11 and corresponds to the active area AA. For example, the filter layer 16 may include a red filter, a green filter and a blue filter. Their material may be transparent material, for example, pigment or dye. In the embodiment, the shading layer 13 and the filter layer 16 are included in a color filter array and disposed on the first substrate 11, so that the first substrate 11 having the color filter array becomes a color filter substrate. In addition, a TFT (thin film transistor) array (not shown in the figure) is disposed on the second substrate 12, so that the second substrate 12 having the TFT array becomes a TFT substrate. However, in other embodiments, the shading layer 13 and the filter layer 16 may be respectively disposed on the second substrate 12, so it becomes a BOA (black matrix on array) substrate or a COA (color filter on array) substrate, and it is not limited thereto.

The adhesive agent 14 is disposed between the first substrate 11 and the second substrate 12, and it encloses the first substrate 11 and the second substrate 12. Herein, the adhesive agent 14 corresponds to the shading layer 13, and the adhesive agent 14 is between the second substrate 12 and the shading layer 13. Thus, when overlooking the display panel 1 in the embodiment, it is found that the adhesive agent 14 is covered by the shading layer 13. The adhesive agent 14 may be heat curing adhesive, light curing adhesive or their combination. In the embodiment, the adhesive agent 14 is light curing adhesive (for example UV curing adhesive) and it is applied to and surrounds the first substrate 11 and the second substrate 12 for example but not limited to. In addition, the adhesive agent 14, the first substrate 11 and the second substrate 12 may define a space (not labeled in figure), and the display medium layer 15 can be disposed in the space. Herein, for example but not limited to, ODF (one drop filling) is utilized to fill the space enclosed by the adhesive agent 14 with the liquid crystal molecules.

Besides, at least one spacer 17 is disposed between the first substrate 11 and the second substrate 12, and it is correspondingly located within the peripheral area BB (not shown in FIG. 1 and FIG. 3). Herein, the material of the space 17 may be resin, silicate salts, fiberglass, photosensitive resist material, etc. and it is not limited to. The spacer 17 is utilized to keep the interval between the first substrate 11 and the second substrate 12, so the space is filled with the liquid crystal molecules. In addition, the display panel 1 may further includes a plurality of scan lines and a plurality of data lines (no shown in the figure). The scan lines and the data lines are interlaced to define a plurality of pixels. Therefore, when the scan lines of the display panel 1 receive a scan signal, the TFTs corresponding to the respective scan lines accordingly turn on and data signals corresponding to the pixels of respective columns are transmitted to the corresponding pixels by the data lines. Thus, the display panel 1 can display an image screen.

Referring to FIG. 2 and FIG. 3 again, the shading layer 13 located in the peripheral area BB includes a first contact surface 131 contacting with the first substrate 11, and the first contact surface 131 has a first edge L1 away from the active area AA. In addition, the adhesive agent 14 includes two second contact surfaces 141, 142 respectively facing the first substrate 11 and the second substrate 12, and one of the second surfaces 141, 142 has a second edge L2 near the active area AA. Herein, the second edge L2 is a line edge of the second contact surface 141 of the adhesive agent 14 which contacts with the shading layer 13. The second edge L2 is not a smooth straight line, so the line edge roughness of the second edge L2 of the second contact surface 141 is greater than that of the first edge L1 of the first contact surface 131. Herein, the greater line edge roughness means that the edge of the line is not smooth so it is a bent line. Preferably, the line edge roughness of the second edge L2 of the second contact surface 141 facing the first substrate 11 and the line edge roughness of the second edge (not labeled) of the second contact surface 142 facing the second substrate 12 both are greater than that of the first edge L1 of the first contact surface 131. Because the line edge roughness of the second edge L2 of the adhesive agent 14 is greater, relatively the contact length between the adhesive agent 14 and the substrates is also longer. Therefore, the adhesive capability between the adhesive agent 14, the first substrate 11 and the second substrate 12 is enhanced, so the tightness of the display panel 1 is improved. The adhesive capability of the adhesive agent 14 to the two substrates is greater, and the external moisture will as little as possible enter the display panel 1.

In addition to the feature that the line edge roughness of the second edge L2 is greater than that of the first edge L1, the display panel 1 in the embodiment further has the following features. The first substrate 11 further has a third edge L3 away from the active area AA, and the first edge L1 of the shading layer 13 is located between the second edge L2 and the third edge L3. However, in other embodiments, the first edge L1 of the shading layer 13 may align with the third edge L3. Besides, the adhesive agent 14 further has a fourth edge L4 away from the active area AA. Preferably, the line edge roughness of the fourth edge L4 is also greater than that of the first edge L1 of the first contact surface 131. Therefore, the contact length of the adhesive agent 14 and the first substrate 11 (and the second substrate 12) is extended to enhance their adhesive capability.

Besides, referring to FIG. 2 again, the shading layer 13 further includes a first side wall S1 located in the non-active area BB, the adhesive agent 14 further includes a second side wall S2 near the first side wall of the shading layer and near the active area AA, and the surface roughness of the second side wall S2 is greater than that of the first side wall S1. In other words, in FIG. 2, the line edge roughness of the second edge L2 of the adhesive agent 14 is greater than that of the first edge L1 of the shading layer 13, and the surface roughness of the second side wall S2 is also greater than that of the first side wall S1 of the shading layer 13. In addition, in the adhesive agent 14 of FIG. 2, another side wall (namely the outer side wall of the adhesive agent 14) opposite the second side wall S2 also includes a rough surface, and the surface roughness of another side wall is also greater than that of the first side wall S1 of the shading layer 13.

In addition, one of the second contact surfaces 141, 142 further includes an embossed pattern P, and the embossed pattern P is like a lattice. As shown in FIG. 3, the embossed pattern P in the embodiment is located at the side of the second contact surface 141 which is farther away from the active area AA. Herein, the embossed pattern P is formed purposely. For example, it may be formed by the adhesive agent 14 pressing the fan-out of the circuit line, and it is preferably like a lattice. The embossed pattern P like lattice can further enhance the adhesive capability of the adhesive agent 14 to the substrate.

Besides, the adhesive agent 14 at includes a plurality of bubbles B distributed near the active area AA (as shown in FIG. 3 but the bubbles B are not shown in FIG. 2). The bubbles B are close to the second side wall S2 of the adhesive agent 14. The substance contained in the bubbles B is distinct from the adhesive agent 14. Herein, the substance contained in the bubbles B for example may be liquid crystal molecules. The cause of the bubbles B may be: when filling the space enclosed by the adhesive agent 14 with the liquid crystal molecules, merely part of the liquid crystal molecules will permeate the adhesive agent 14 to form the bubbles B, and therefore the rough surfaces are formed on the second edge L2 and the second side wall S2 of the adhesive agent 14.

Besides, referring to FIG. 1 again, the adhesive agent 14 is formed as an enclosure between the first substrate 11 and the second substrate 12 and its shape is similar to a rectangle (namely rectangular space). The adhesive agent includes at least one straight portion 143 and at least one corner portion 144. Herein, there are four straight portions 143 and four corner portions 144, and the maximum width d1 of the corner portion 144 is greater than the maximum width d2 of the straight portion 143 (d1>d2). Because the maximum width d1 of the corner portion 144 is greater than the maximum width d2 of the straight portion 143, the corner portion 144 has larger area on condition of the same length. Therefore, it increases the contact area between the corner portions 144 and the two substrates to enhance the adhesive capability at the corner portions 144.

Figure 4:
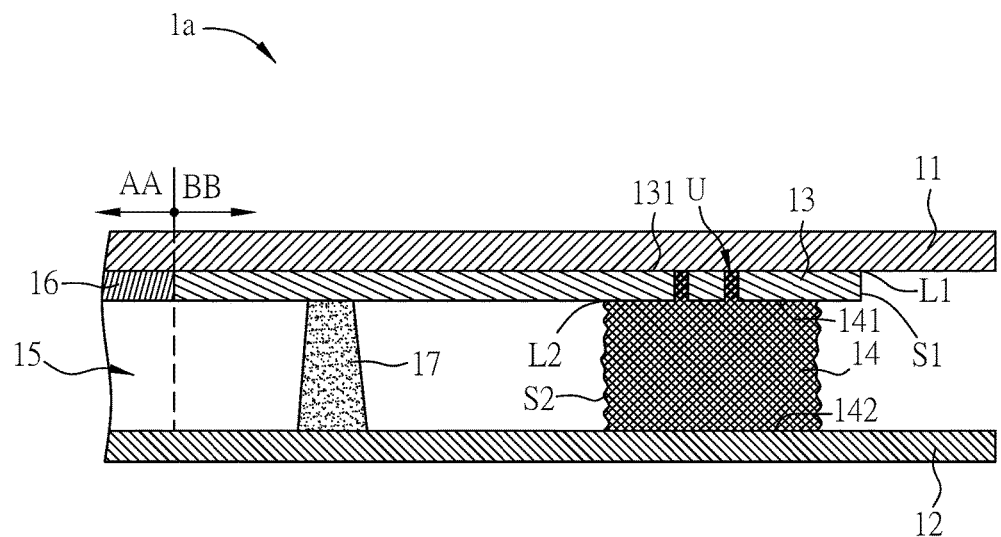
FIG. 4 is a sectional schematic diagram showing the display panel according to another example of the disclosure.

Referring to FIG. 4, it is a sectional schematic diagram showing the display panel 1a according to another example of the disclosure.

The difference from the display panel 1 in FIG. 2 is that the shading layer 13 of the display panel 1a further includes a groove U which corresponds to the adhesive agent 14. Herein, there are two grooves U for example. Preferably, the grooves U correspond to the peripheral area BB and surround the active area AA, and the grooves U are filled with the adhesive agent 14. In other words, the grooves U on the shading layer 13 of the display panel 1a may be arranged in a circle corresponding to the adhesive agent 14. Therefore, it blocks the active area AA from the moisture from the outer of the shading layer 13, and enhances the adhesion strength of the adhesive agent 14 and the shading layer 13. In addition, during assembling the first substrate 11 and the second substrate 12, the groove U can prevent the adhesive agent 14 from moving toward the outside of the substrate.

Because the technique features of other elements of the display panel 1a can refer to those of the display device 1, they are not repeated here again.

Figure 5:
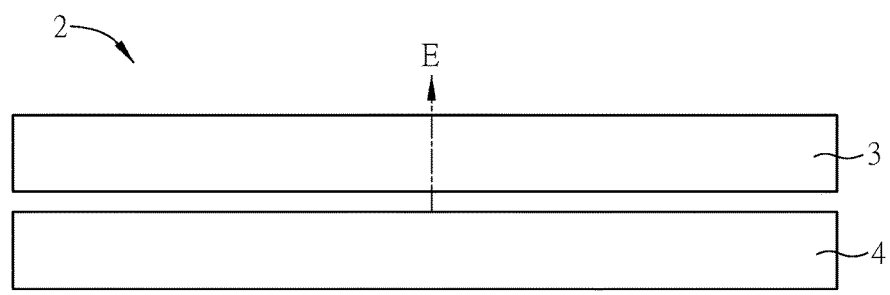
FIG. 5 is a schematic diagram showing a display device according to the embodiment of the disclosure.

In addition, referring to FIG. 5, it is a schematic diagram showing a display device 2 according to the embodiment of the disclosure.

The display device 2 includes a display panel 3 and a backlight module 4. The display panel 3 and the backlight module 4 are disposed opposite each other. The display device in the embodiment is an LCD device, and the display panel 3 employs one of the above mentioned display panel 1, 1a, or other various implementation. Because specific technique contents can refer to the above embodiments, they are not repeated here again. When the light beam E emitted from the backlight module 4 passes through the display panel 3, it displays colors to form an image by each pixel of the display panel 3.

In summary, as to the display panel according to the disclosure, the shading layer includes a first contact surface contacting with the first substrate, and the first contact surface has a first edge. In addition, the adhesive agent corresponds to the shading layer, and the adhesive agent includes two second contact surfaces respectively facing the first substrate and the second substrate. One of the second surfaces has a second edge near the active area, and the line edge roughness of the second edge is greater than that of the first edge. Because the line edge roughness of the second edge of the adhesive agent is greater, relatively the contact length between the adhesive agent and the substrates is also longer. Therefore, the adhesive capability between the adhesive agent and the substrate is enhanced, and the display medium will as little as possible leak. Besides, the external moisture will also as little as possible enter the display panel, so the product reliability of the display panel is improved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display panel including an active area and a peripheral area surrounding the active area, comprising:
    a first substrate;
    a second substrate disposed opposite the first substrate;
    a shading layer disposed on the first substrate and located in the peripheral area, wherein the shading layer includes a first contact surface contacting with the first substrate, and the first contact surface has a first edge, the first edge is away from the active area; and
    an adhesive agent disposed between the first substrate and the second substrate and corresponding to the shading layer, wherein the adhesive agent includes two second contact surfaces respectively facing the first substrate and the second substrate, one of the second contact surfaces has a second edge near the active area, and a line edge roughness of the second edge in the normal direction of the second contact surface is greater than a line edge roughness of the first edge in the normal direction of the first contact surface,
    wherein the first substrate has a third edge away from the active area, the third edge is near the first edge, and the first edge of the shading layer is located between the second edge of the adhesive agent and the third edge of the first substrate.

2. The display panel of claim 1,
    wherein the first substrate comprises a color filer array, and the color filer array comprises the shading layer and a filter layer.

3. The display panel of claim 1, wherein the shading layer further comprises a first side wall, the adhesive agent further comprises a second side wall near the first side wall of the shading layer, and the surface roughness of the second side wall is greater than that of the first side wall.

4. The display panel of claim 3, wherein the second side wall of the adhesive agent is near the active area.

5. The display panel of claim 3, wherein the adhesive agent further comprises a plurality of bubbles, and the bubbles are close to the second side wall.

6. The display panel of claim 1, wherein the shading layer further comprises a groove, and the groove corresponds to the adhesive agent.

7. The display panel of claim 1, wherein the adhesive agent is formed as a rectangular enclosure between the first substrate and the second substrate, the adhesive agent includes at least one straight portion and at least one corner portion, and the maximum width of the corner portion is greater than that of the straight portion.

8. The display panel of claim 1, further comprising:
    a display medium layer, disposed in a space defined by the adhesive agent, the first substrate and the second substrate.

9. A display panel including an active area and a peripheral area surrounding the active area, comprising:
    a first substrate;
    a second substrate disposed opposite the first substrate;
    a shading layer disposed on the first substrate and located in the peripheral area, wherein the shading layer includes a first contact surface contacting with the first substrate, and the first contact surface has a first edge, the first edge is away from the active area; and
    an adhesive agent disposed between the first substrate and the second substrate and corresponding to the shading layer, wherein the adhesive agent includes two second contact surfaces respectively facing the first substrate and the second substrate, one of the second contact surfaces has a second edge near the active area, and a line edge roughness of the second edge in the normal direction of the second contact surface is greater than a line edge roughness of the first edge in the normal direction of the first contact surface,
    wherein one of the second contact surfaces further comprises an embossed pattern, and the embossed pattern is like a lattice.

10. A display panel including an active area and a peripheral area surrounding the active area, comprising:
    a first substrate;
    a second substrate disposed opposite the first substrate;
    a shading layer disposed on the first substrate and located in the peripheral area, wherein the shading layer includes a first contact surface contacting with the first substrate, and the first contact surface has a first edge, the first edge is away from the active area; and
    an adhesive agent disposed between the first substrate and the second substrate and corresponding to the shading layer, wherein the adhesive agent includes two second contact surfaces respectively facing the first substrate and the second substrate, one of the second contact surfaces has a second edge near the active area, and a line edge roughness of the second edge in the normal direction of the second contact surface is greater than a line edge roughness of the first edge in the normal direction of the first contact surface,
    wherein the adhesive agent includes a plurality of bubbles distributed near the active area.

* * * * *